June 20, 1967  A. J. WILD  3,325,967
EQUIPMENT FOR DEPOSITING ARTICLES IN RECEPTACLES
Filed March 9, 1965  6 Sheets-Sheet 1

ANTON J. WILD
INVENTOR.

BY *Albert Sperry*

ATTORNEY

ANTON J. WILD
INVENTOR.

BY Albert Sperry
ATTORNEY

June 20, 1967  A. J. WILD  3,325,967
EQUIPMENT FOR DEPOSITING ARTICLES IN RECEPTACLES
Filed March 9, 1965  6 Sheets-Sheet 3

ANTON J. WILD
INVENTOR.

BY Albert Sperry.

ATTORNEY

June 20, 1967  A. J. WILD  3,325,967
EQUIPMENT FOR DEPOSITING ARTICLES IN RECEPTACLES
Filed March 9, 1965  6 Sheets-Sheet 4

ANTON J. WILD
INVENTOR

BY Albert S. Spery

ATTORNEY

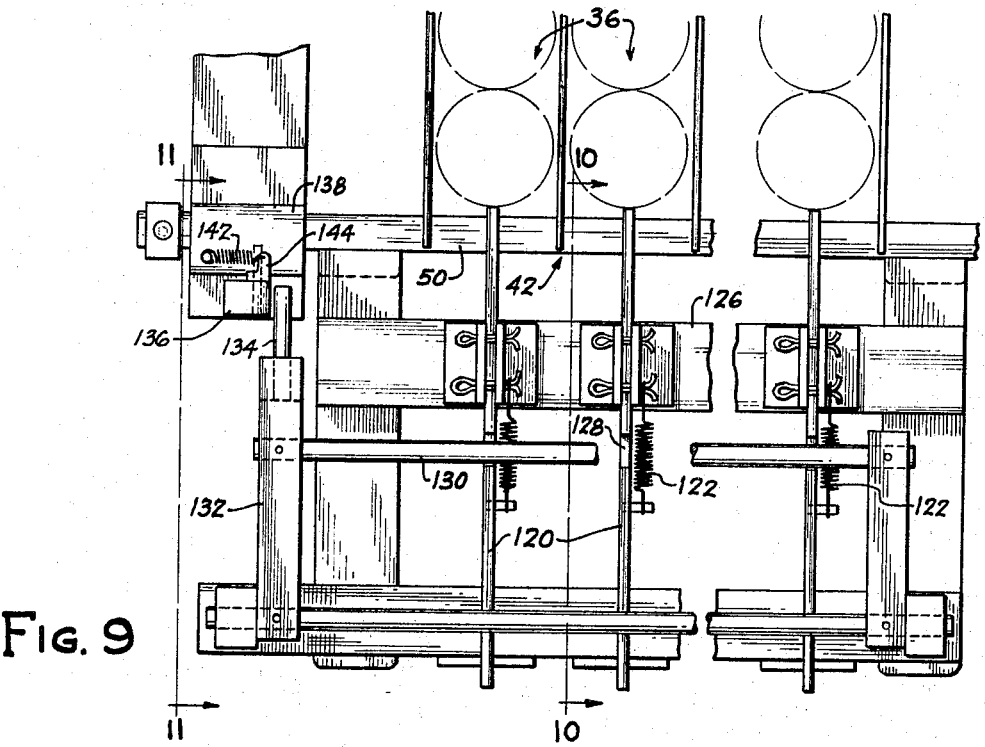
FIG. 9
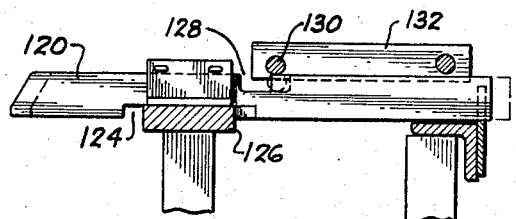
FIG. 10
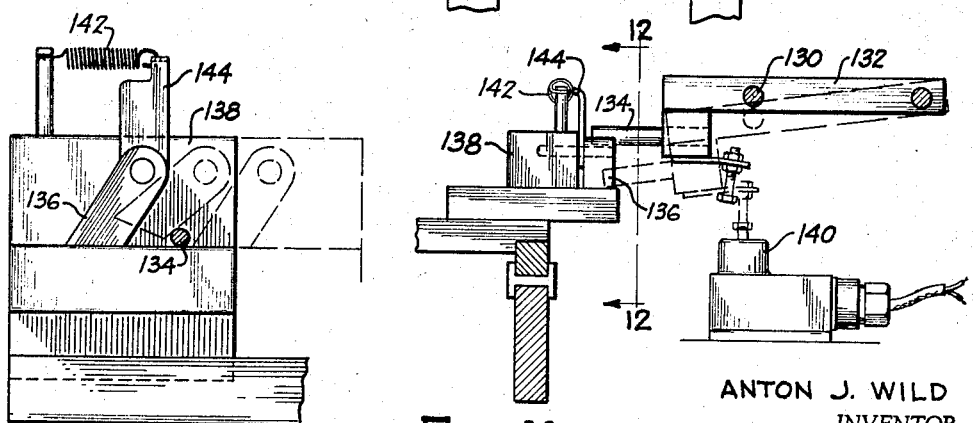
FIG. 12
FIG. 11
ANTON J. WILD
INVENTOR.
BY Albert Sperry
ATTORNEY

ANTON J. WILD
INVENTOR.

BY Albert S Perry
ATTORNEY

United States Patent Office 3,325,967
Patented June 20, 1967

3,325,967
EQUIPMENT FOR DEPOSITING ARTICLES IN
RECEPTACLES
Anton J. Wild, 968 Bonnell Court, Union, N.J. 07083
Filed Mar. 9, 1965, Ser. No. 438,244
20 Claims. (Cl. 53—262)

This invention relates to carton filling equipment and is directed particularly to the combination of a control head and packer grid for receiving articles and delivering them to cartons, cases or other receptacles or packages in an orderly manner.

The control heads and packer grids of the prior art and the mechanism for actuating the same have heretofore been relatively complicated in construction requiring the use of many different elements with the result that they are expensive to produce and maintain. Difficulties are also encountered due to the manner in which articles are fed to the control head with the result that the articles may jam or be displaced and labels on bottles, cans or the like may be torn or scratched so as to render them unsightly. It has also been difficult in previous constructions to assure accurate alignment of the elements of the control head, article supporting means the packer grid so as to assure proper vertical movement and delivery of articles from the control head to the carton, case or package in which the articles are to be positioned. Moreover, prior assemblies have been such that the head and grid are not separable to permit ready access to the parts for replacement or repair.

In accordance with the present invention, a new type of control head and a novel combination and arrangement of a control head with a packer grid are provided which are relatively simple in construction and operation, assure proper feed of the bottles or other articles into the control head, maintain accurate alignment of elements for proper delivery of articles to a carton or receptacle, and permit ready separation of the elements of the assembly to afford access thereto for repair or replacement.

Accordingly, the principal objects of the present invention are to simplify the construction and reduce the cost of control heads for use in article packing equipment; to assure the accurate positioning, guiding and delivery of articles from a source of supply to a case, carton or receptacle; to maintain accurate registry of the elements of a control head, article support and packer grid; and to facilitate access to such elements for repair and replacement thereof.

These and other objects and features of the present invention will appear from the following description thereof wherein reference is made to the figures of the accompanying drawings.

In the drawings:

FIG. 6 is a side elevation of the construction indicated at 6—6 in FIG. 2a;

FIG. 9 is a plan view showing an alternative type of control means adapted for use in the present invention;

FIG. 10 is a sectional view of the construction shown in FIG. 9 taken on the line 10—10 thereof;

FIG. 11 is a sectional view of the construction of FIG. 9 taken on the line 11—11 thereof;

FIG. 12 is a sectional view taken on the line 12—12 of FIG. 11;

Figure 1:
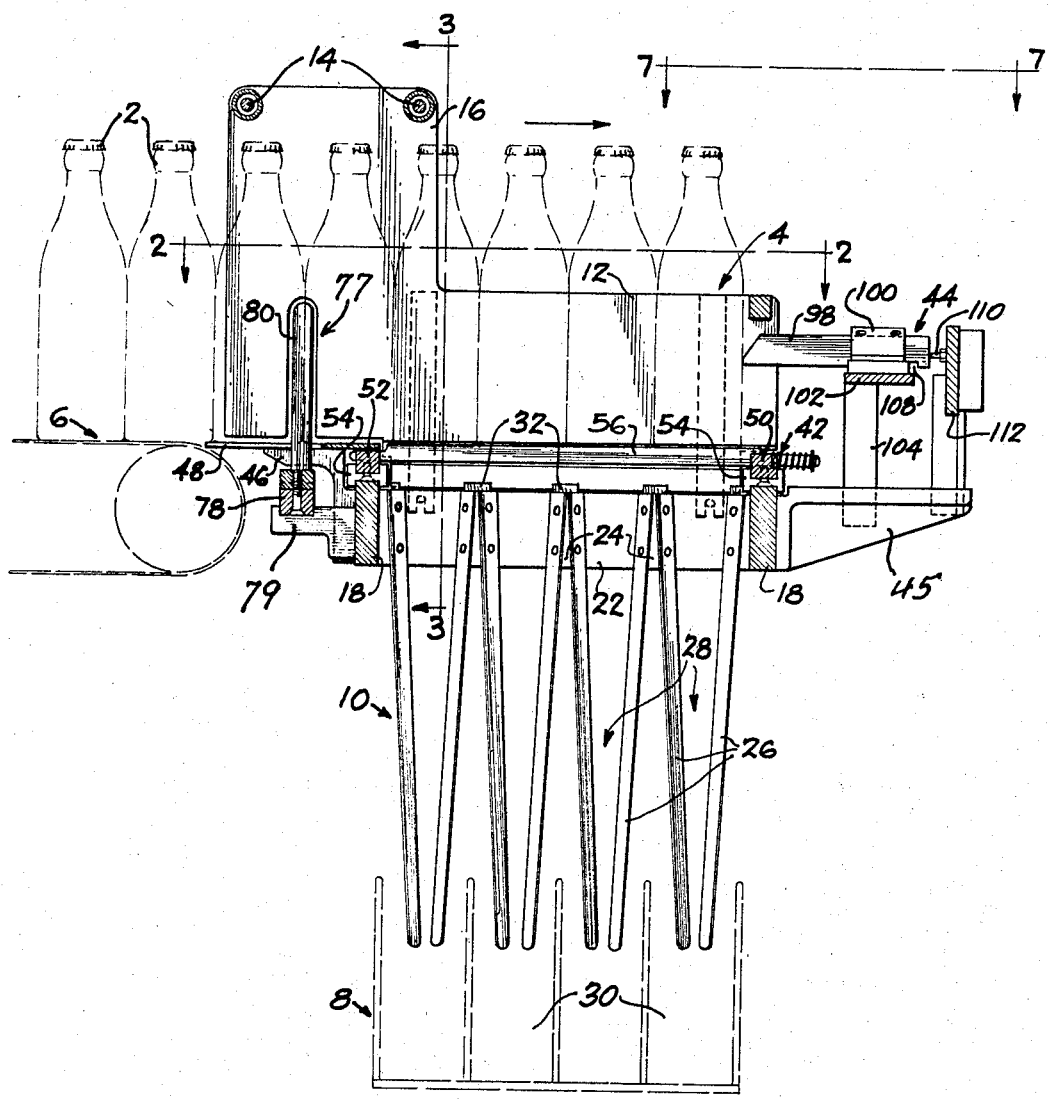
FIG. 1 is a vertical sectional view of a control head and packer grid assembly embodying the present invention.

In that form of the invention chosen for purposes of illustration in the drawings, the equipment is particularly adapted for use in loading bottles or cans into cartons, cases and the like provided with dividers defining cells or compartments for receiving the bottles. The articles illustrated are bottles 2 which are supplied to the control head 4 by a conveyor 6 or other article feeding means for transfer vertically to the carton 8 through the article guiding packer grid 10. The carton 8 to be filled is moved into position below the packer grid 10 by conventional mechanism, not shown, and after being filled is removed while another carton is moved into place to receive a complement of bottles or articles from the assembly on each cycle of operation of the equipment.

Figure 3:
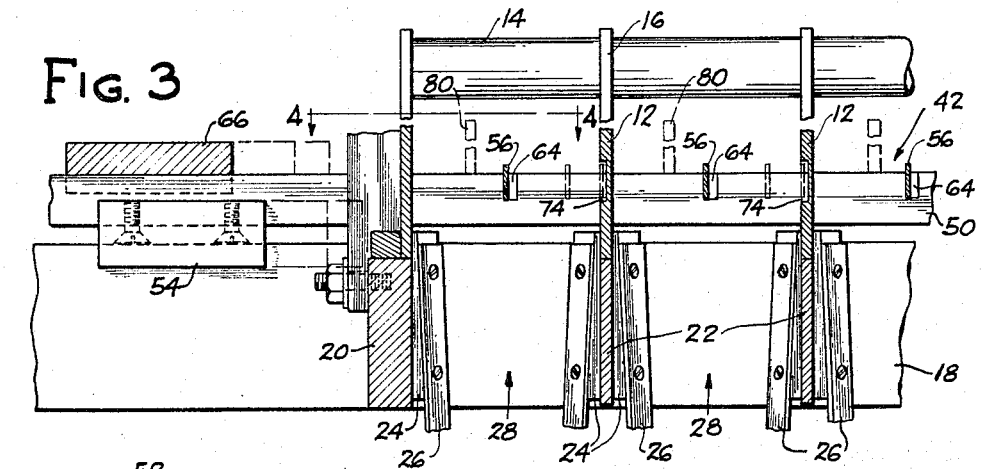
FIG. 3 is a vertical sectional view of the assembly shown in FIG. 1 taken on the line 3—3 thereof.
Figure 4:
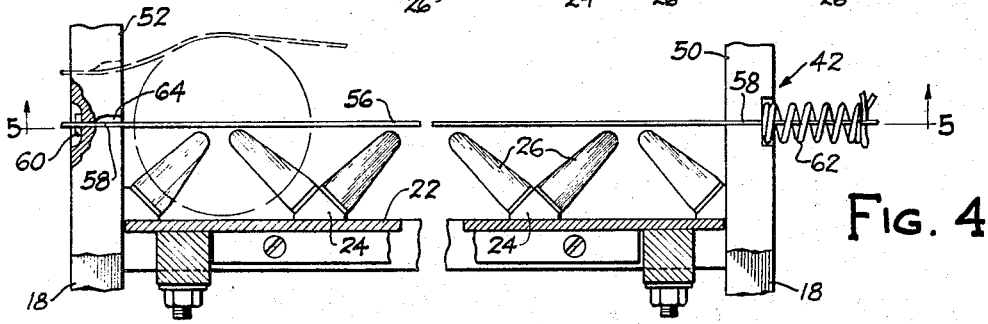
FIG. 4 is a horizontal sectional view taken on the line 4—4 of FIG. 3 (but turned at 90° with respect to FIG. 3)

In the construction illustrated, the control head 4 is provided with a plurality of stationary and parallel dividers 12 connected together by rods 14 or the like which serve to hold the upper portions or extensions 16 of the dividers in fixed spaced relation. The packer grid 10 is located below the control head 4 and may be of any suitable or preferred type but preferably is constructed in accordance with U.S. Patent No. 3,031,820. Thus as shown in FIGS. 1, 3, and 4, the packer grid 10 has a frame including front and rear members 18 fixedly connected to opposite end members 20. Parallel strips 22 extend between the front and rear members 18 of the packer grid and have tapered blocks 24 secured thereto. Flexible fingers 26 are mounted on the blocks 24 and held in inclined positions so as to cooperate with each other to define a plurality of vertical article guiding passages 28 through which the articles to be packed may move downward from the control head 4 to the compartments or cells 30 in the carton 8 to be filled.

In accordance with the present invention, the packer grid is provided with upwardly facing positioning means registering with the lower edges of the parallel dividers 12 for receiving and holding the lower edges of the dividers in fixed spaced relation. The positioning means shown are provided by locating the finger supporting blocks 24 on the frame and on opposite sides of the parallel strips 22 of the packer grid so that they project above the upper edges thereof as shown at 32 in FIG. 3 to form slots 34 for receiving the lower edges of the dividers 12. The packer grid and its vertical article guiding passages 28 are thus arranged for accurate registry with the horizontal channels 36 between dividers 12 of the control head into which the bottles 2 are moved by the conveyor 6 or other article feeding means. At the same time, the dividers 12 are held in accurate positions with respect to the packer grid so as to cooperate therewith to provide a single continuous vertical article guiding passage 28 for each article extending downward from the control head 4 to the compartments 30 of the carton 8 to be filled. In this way, the control head 4 and packer grid 10 may be constructed as separable units while having interfitting parts which serve to hold them in fixed relative positions during use. However, upon removal of the control head, the article guiding fingers 26 of the packer grid and the other elements of the assembly are readily accessible for easy replacement, adjustment or repair when necessary.

The packer grid may be mounted in fixed position on the machine in any suitable or conventional manner to register properly with the horizontal channels 36 of the control head and the compartments 30 of the cartons 8 to which the articles are to be delivered. Thus the front and rear members 18 of the packer grid extend beyond the end members 20 of the grid and are bolted or otherwise secured in place on stationary support members 38 of the machine.

Whereas the control head 4 with its dividers 12 is removably supported by the packer grid 10, the packer grid also supports a transversely movable article controlling frame 42. The packer grid further has control mechanism 44 carried thereby and located in front of the article controlling frame by means of brackets 45 mounted the front member 18 of the grid and has article stop means 77 located at the rear of the article controlling frame 42 by means of brackets 79 mounted on the rear member 18 of the packer grid.

Figure 5:
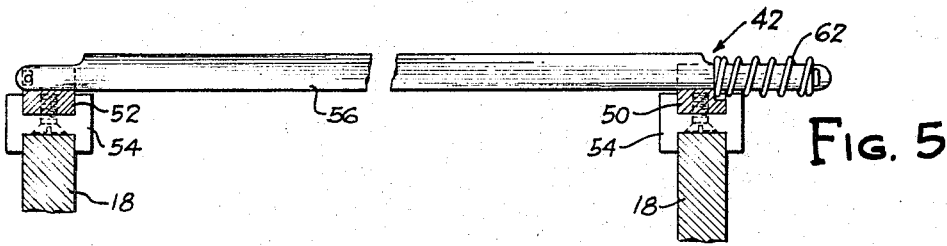
FIG. 5 is a sectional view taken on the line 5—5 of FIG. 4.
Figure 6:
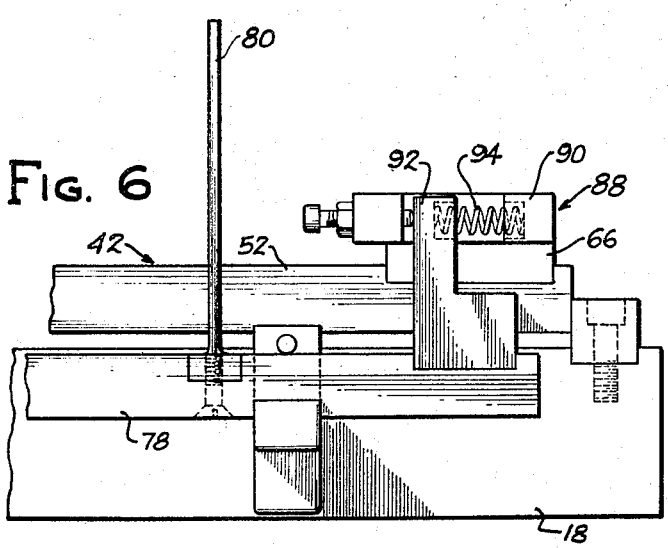

The rear member 18 of the packer grid also is provided with brackets 46 having in-feed plates 48 thereon aligned with longitudinally extending rows of bottles or articles 2 to be fed to the horizontal channels 36 of the control head by the conveyor 6. The upper edges of the front and rear members 18 of the packer grid serve as bearing and guide surfaces along which the front and rear elements 50 and 52 of the article controlling frame 42 are slidably movable. The elements 50 and 52 are provided with H-shaped anti-friction members 54 as shown in FIGS. 1 and 5 which are carried by the elements 50 and 52 and bear against the upper edges of the front and rear members 18 of the packer grid 10. Article or bottle supporting strips 56 extend from the rear element 52 of the frame 42 to the front element 50 thereof and are arranged in parallel relation and spaced apart a distance equal to the width of the horizontal channels 36 of the control head and the spacing of the dividers 12. The bottle or article supporting strips 56 are preferably in the form of relatively thin metal members positioned on edge within vertical slots 58 in the elements 50 and 52 of the frame 42 and as shown in FIGS. 4 and 5 are removably secured in place by cross pins 60 which bear against the rear face of the rear element 52 of the frame and by springs 62 which bear against front element 50 of the frame. Further, as shown in FIG. 4, the inner side of the slot 58 in the rear element 52 of the frame may be enlarged as shown at 64 to permit the strip 56 to be deflected without shearing off in the event a bottle or other article should slip down past the strip as shown in dotted lines in FIG. 4.

The article controlling frame 42 is movable transversely of the control head 4 and with respect to the stationary dividers 12 which form the horizontal channels 36. For this purpose, the frame 42 has cross members 66 and 68 secured to the front and rear elements 50 and 52 by bolts 70 and actuating means 72 are mounted on a stationary portion of the equipment and engage the cross member 66 of the frame 42. The actuating means 72 may be electrically, mechanically or fluid operated in timed relation to the operation of the remaining elements of the assembly.

Figure 2A:
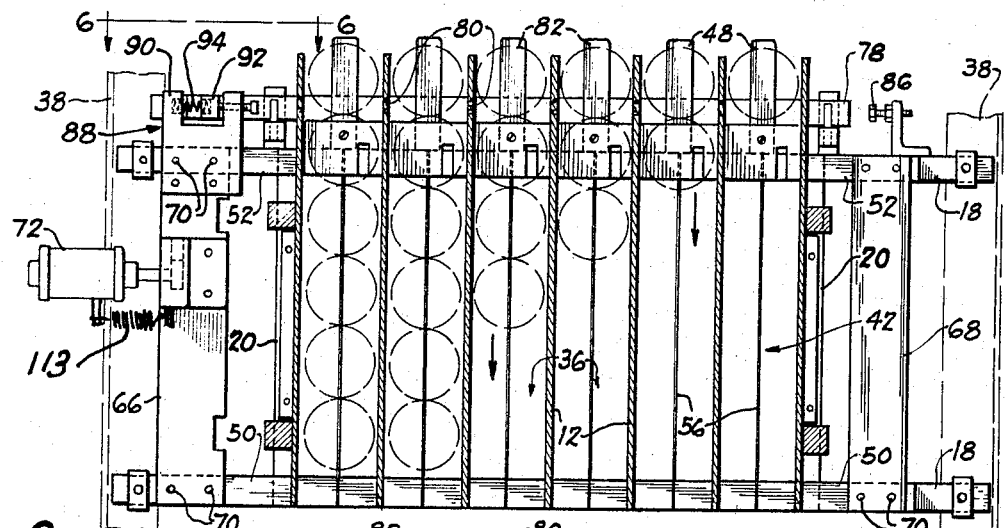
FIGS. 2a, 2b and 2c are top plan views of the assembly shown in FIG. 1 taken on the line 2—2 thereof and showing the elements in successive positions to which the control frame and article stop means may be moved.

When the article controlling frame 42 is in the position shown in FIG. 2a, the bottle supporting strips 56 are located in positions beneath the horizontal channels 36 between the dividers 12 so as to support the bottles 2 or other articles moved into the channels 36 to fill the channels. Thereafter on operation of the actuating means 72, the frame 42 and bottle supporting strips 56 are moved through the position of FIG. 2b to the discharge position of FIG. 2c. As shown in FIG. 3, the lower portions of the dividers 12 are recessed at 74 to receive and house the bottle supporting strips 56 and, therefore, when the frame 42 is moved to the bottle discharging position of FIG. 2c, the strips 56 are positioned within the recesses 74 and the exposed faces 76 thereof are substantially flush with the adjacent vertical surfaces of the dividers 12. In this way, the dividers 12 and strips 56 cooperate to present smooth, substantially unbroken, side walls for the vertical article guiding passages 28 which extend downward from the channel 36, past the flexible fingers 26 of the packer grid to the compartments 30 of the case, carton or package 8 to be filled.

In order to control the movement of bottles or articles from the conveyor 6 into the horizontal channels 36 between the dividers 12, and in order to prevent jamming and displacement of the bottles within the channels, a stop bar 78 is mounted on supports 79 on the rear element 18 of the packer grid 10. The stop bar 78 is movable transversely of the head 4 and provided with upwardly extending bottle or article engaging stop pins 80 which are movable with the stop bar into and out of position to engage bottles 82 supported on the feed-in plates 48 and being urged into the channels 36 by the conveyor 6. The bottle stop pins 80 are spaced apart a distance equal to the width of the channels 36 and are aligned with the dividers 12 when the article controlling frame 42 and its strips 56 are in the positions indicated in FIG. 2a to permit movement of the bottles into the channels of the control head 4. However, the stop bar 78 and stop pins 80 are movable with the control frame 42 to the position shown in FIG. 2b upon operation of the actuating means 72. The stop pins 80 then engage the bottles 82 and thrust them rearwardly on the feed-in plates 48 against the action of the conveyor or feeding means 6 so that they will be separated from the bottles in the channels 36 which are ready to be discharged to carton 8. The bottles located within the channels 36 are thereby relieved of pressure and are free for unimpeded vertical movement through the vertical passages 28 when the control frame 42 and strips 56 move to the bottle discharging position of FIG. 2c.

Figure 2B:
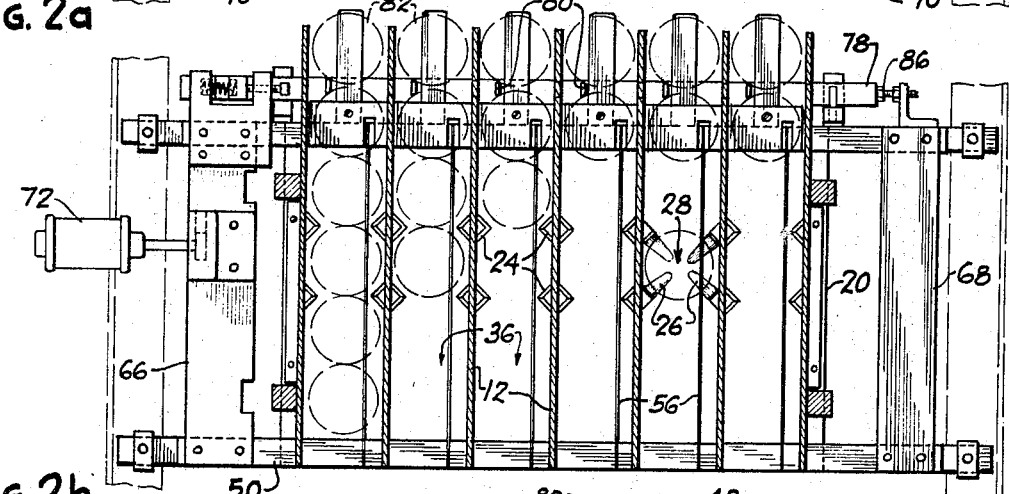
Figure 2C:
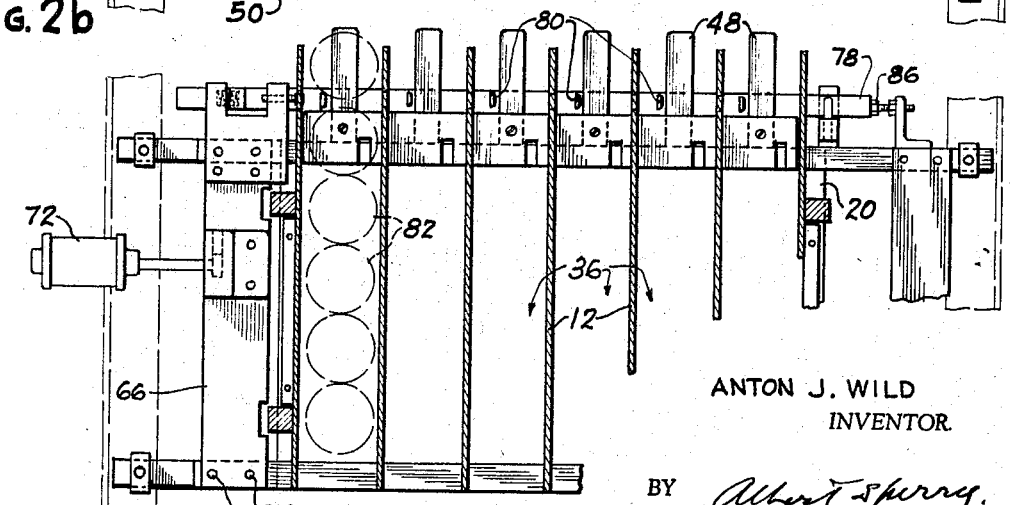

On the other hand, it is necessary to prevent movement of additional bottles into the channels 36 when the control frame 42 and its strips 56 move from the bottle supporting position of FIG. 2b to the bottle discharging position of FIG. 2c. For this purpose, a stop bar limiting lug 86 is positioned to be engaged by the stop bar 78 and a lost motion connection is provided between the control frame 42 and the stop bar 78. This connection is shown at 88 and includes a yoke 90 mounted on the cross member 66 and movable with the cross member of the control frame 42. A lug 92 carried by the stop bar 78 projects upward into the space between the arms of the yoke 90 and a spring 94 is positioned between the lug 92 and one of the arms of the yoke. With this construction, when the frame 42 is moved from the position of FIG. 2a to the position of FIG. 2b, the stop bar 78 and stop pins 80 will move with the control frame until the end of the stop bar engages the limit lug 86. The stop bar will then remain in the position of 2b and serve to prevent additional bottles or articles from being moved into the channels, whereas the control frame 42 will be moved on to the position of FIG. 2c against the action of the spring 94 to release the complement of bottles or articles 2 within the channels 36 for vertical discharge through the article guiding passages 28 and packer grid 10 to the carton 8 below the assembly.

The operation of the actuating means 72 to move the article controlling frame 42 and stop bar 78 transversely for discharge of the articles from the control head is controlled by suitable means such as the control mechanism 44 shown in FIGS. 1, 6, 7 and 8 or the alternative construction of FIGS. 9 to 12. The control mechanism of FIGS. 1, 6, 7 and 8 is pneumatically operated and includes feeler elements such as the members 98. These members are located centrally of each channel 36 adjacent the front of the control head and are longitudinally slidable in guides 100 on the transversely extending support 102 mounted on brackets 104. A light spring 106 is associated with each feeler member 98 and connected to the member 98 and to guide 100 to urge the feeler member inwardly toward the channel 36 with which it is associated. However, the feeler strips are provided with notches 108 which embrace the support 102 to limit the movement thereof inward toward the bottles in the channels 36. The outer ends of the feeler elements 98 are positioned to engage and actuate pneumatic valves 110 supported on the strip 112, upon outward movement of the feeler strips due to the pressure of the bottles being pushed into the channels 36 by the conveyor 6 or other bottle feeding means employed. The valves 110 are connected in series in a fluid line 114 which extends to an air cylinder 116 which is movable to operate a switch 117 electrically connected to actuating means 72. The fluid line 114 further may be provided with a safety valve 115 adapted to be manually operated in the event any jamming or faulty operation of the equipment should occur.

With this construction, the bottles or articles to be packaged are fed into the horizontal channels 36 by the conveyor or feeding means 6 so as to fill the channels and cause the bottles to push the feeler elements 98 outward against the action of the springs 106. During this operation the control frame is in the position of FIG. 2a wherein the article supporting strips are substantially centered with respect to the channels 36 and serve to support the articles in the channels.

When a full complement of bottles has been fed into the channels 36 and all of the feelers 98 have been moved outward to actuate the valves 110, air pressure is exerted through line 114 to energize the actuating means 72. The control frame 42 is then moved from the position of FIG. 2a to that of FIG. 2b and the stop bar 78 moves with the control frame to move the stop pins 80 to the right as seen in FIG. 2b. The stop fingers then press against the row of bottles 82 resting on the in-feed plates 48 so as to push these bottles back and relieve the bottles in the channels 36 from pressure which might otherwise cause the bottles being packaged to be tilted or otherwise displaced improperly prior to delivery thereof to the carton 8.

Thereafter continued movement of the control frame from 42 under the action of the actuating means 72 will occur and the frame with its article supporting strips 56 will move to the position of FIG. 2c while the stop bar 78 and stop fingers 80 will remain in place due to the lost motion connection 88 between the control frame and stop bar. Accordingly the bottles 82 on the feed in plates will remain in place while the article supporting strips will move sideways into positions wherein they are housed in the recesses 74 in the lower portion of the dividers 12. When so positioned the article supporting strips are removed from beneath the bottles in the horizontal channels 36 and are free to move downward under the action of gravity through the vertical channels 28 of the packer grid 10. At the same time, the dividers 12 and the elements of the packer grid are held in fixed relative positions presenting continuous unbroken vertical surfaces by reason of their interfitting connection and the nesting of the article supporting strips 56 in the recesses 74 of the dividers. The freely positioned bottles then pass down between the flexible fingers 26 of the packer grid and are smoothly and accurately guided into the compartments 30 of a carton 8 located beneath the packer grid.

When the bottles or articles are thus packed by movement downward from the channels 36 the feeler elements 98 move inward under the action of springs 106. However, the lengths of the notch 108 in the bottom of each feeler element is such that the inward movement of the feeler element is limited by engagement of the outer end or shoulder of notch 108 with support 102 whereby the tendency for the feeler element to engage and move inward so as to tilt the bottle as it descends is overcome. The feeler element instead moves only a small distance inward and does not engage the upper portion of the bottle, where its diameter is reduced, and eliminates the possibility of cocking, tilting or displacement of any bottle during the downward movement thereof. Furthermore, upon downward movement of the bottles and inward movement of the feeler elements 98, the valves 110 are again closed to deenergize the actuating means 72 and cause the control frame 42 to be returned to the position of FIG. 2a under the action of suitable means such as the spring 113. The article supporting strips are thereby returned to their initial position to support a new group of bottles or articles to be packaged. At the same time, the stop bar 78 and stop fingers 80 are also moved to the position of FIG. 2a wherein the channels 36 are no longer blocked and the bottles 82 on in-feed plates 48 as well as additional bottles from the conveyor or feeding device 6 may be advanced into the channels to perform a new cycle of packing operations.

Since the diameter of the bottles or articles being handled by the equipment may vary considerably, especially when the equipment is used for packaging different brands or shapes of bottles, it is sometimes desirable to vary the position of the feeler elements. Thus as shown in FIG. 7, the support 102 and feelers 98 may be moved toward and away from the adjacent ends of the channels 36 by means of the slot and fastener means indicated at 107.

Figure 7:
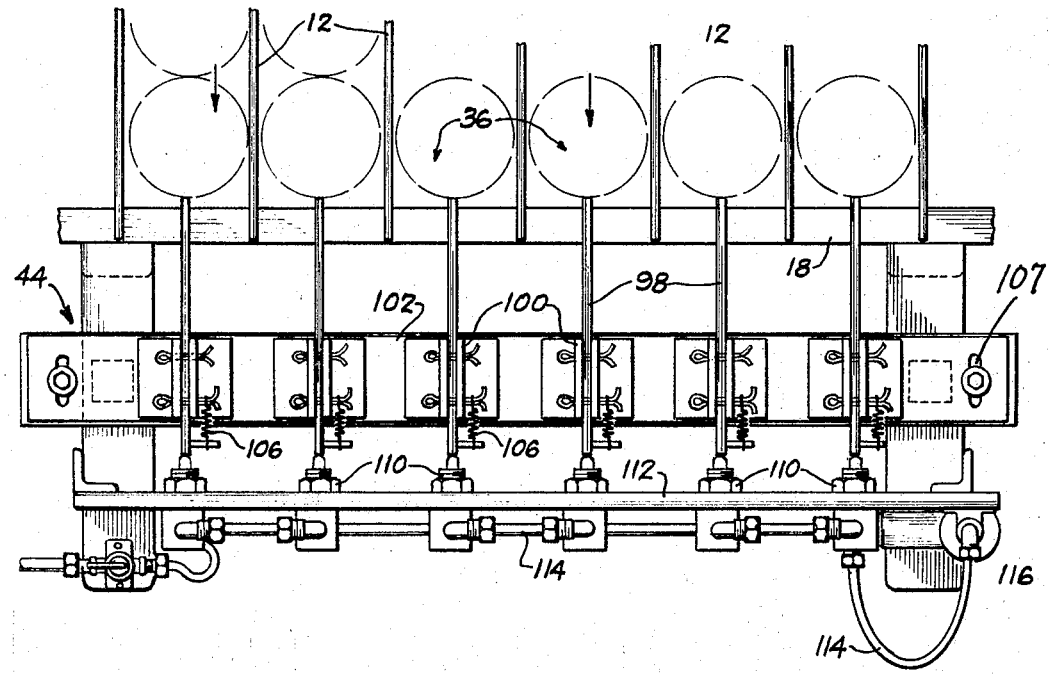
FIG. 7 is a plan view of one form of control means adapted for use in accordance with the present invention taken on the line 7—7 of FIG. 1.
Figure 8:
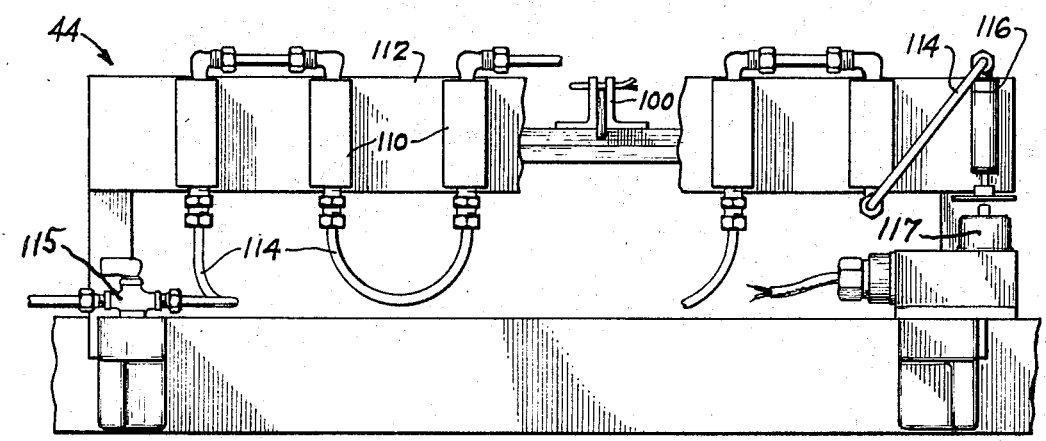
FIG. 8 is a front elevation of the construction shown in FIG. 7.

Instead of employing pneumatic control means as shown in FIGS. 1, 7 and 8, the control means 44 may be mechanically actuated as shown in FIGS. 9 to 12 inclusive. For this purpose, the feeler elements 120 are similar in location and operation to the feeler elements 98 to FIGS. 1, 7 and 8, in that they are urged inwardly by springs 122 and are limited in their movement by engagement of the ends of notch 124 with the support strip 126. However, each feeler element 120 also has a notch 128 in the upper surface thereof. When the feeler elements 120 are all pushed outwardly by bottles in the channels 36 to indicate the presence of a full complement of bottles in the control head, the notches 128 will be aligned and positioned to receive a control bar 130 carried by the pivotally mounted arm 132. Arm 132 has a pin 134 projecting from the end thereof into position to cooperate with a lifting pawl 136 carried by a block 138 secured to the front member 50 of the control frame 42. A micro switch 140 is positioned below the arm 132 and is operable thereby upon downward movement of the arm and control bar 130 in response to outward movement of all of the feeler elements 120 and alignment of the upwardly facing notches 128 therein.

The micro switch 140 is electrically connected to the actuating means 72, which in this instance is electrically operated, to energize the same. The actuating means thereupon serves to move the control frame 32 from the position of FIG. 2a to the positions of FIGS. 2b and 2c, as previously described, for discharging the articles assembled in the channels 36 downward through the packer grid 10 to the case or receptacle 8. The transverse movement of the control frame 42 serves to move the block 138 and lifting pawl 136 to the right as seen in FIGS. 9 and 12 whereby the pawl will ride over the pin 134 on pivoted arm 132 and will be returned to its normal inclined position by means of a spring 142 attached to an arm 144 connected to the pawl 136. Thereafter, when the bottles or articles have been discharged from the control head and the control grid is returned to the position of FIG. 2a, the inclining lifting pawl 136 will pass beneath the pin 134 on arm 132 to raise the arm and the control bar 130 to the full line position of FIGS. 10 and 11. In this way, the control bar will be lifted out of the aligned notches 128 in the upper edges of the feeler elements 120 to permit them to return to their full line active positions of FIGS. 9 and 10 under the action of springs 122.

The elements of the control means 44 and the control frame 42 will thereby be restored to their initial positions in readiness for a renewed cycle of operations to package a new group of bottles or articles.

At times, it is found that the action of the spring pressed feeler members 98 in being urged inward toward the bottles or rounded articles in the channels 36, tends to push the bottles back toward the stop pins 80 which engage the last bottle in each channel. When this occurs, the bottles tend to rub or bind against each other in the channel, and they may be displaced or prevented from moving freely downward through the vertical passages 28 in the packer grid.

Figure 13:
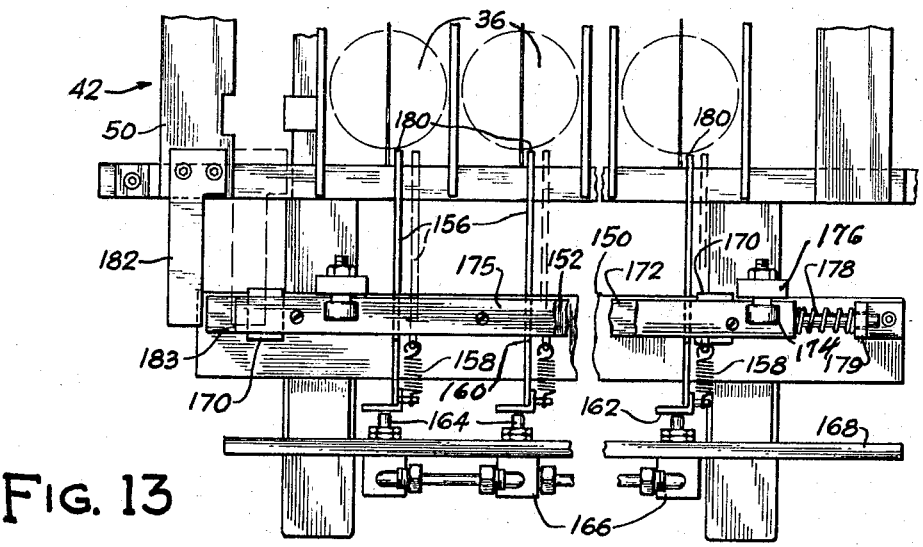
FIG. 13 is a plan view of a further alternative form of control means which may be employed in the practice of the present invention.
Figure 14:
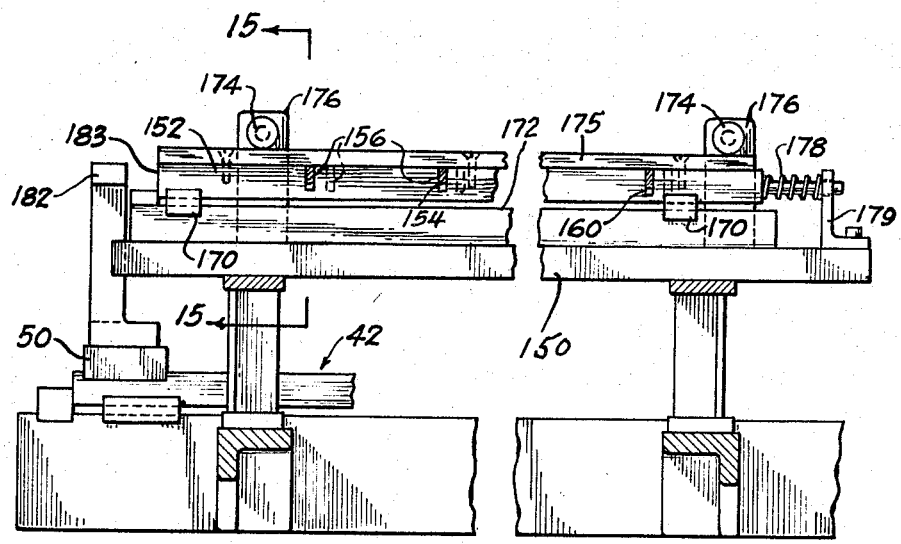
FIG. 14 is a front elevation partly in section showing the construction of FIG. 13.
Figure 15:
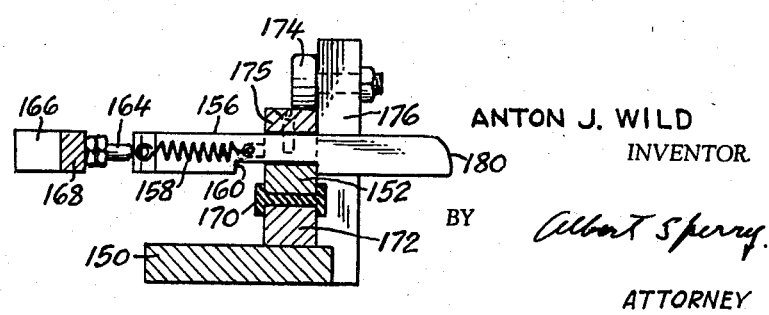
FIG. 15 is a sectional view taken on line 15—15 of FIG. 14.

In order to overcome this difficulty, it is sometimes preferably to employ a construction of the type illustrated in FIGS. 13 and 14. As there shown, the support 150 (corresponding to support 102 of FIG. 7) is provided with a transversely movable bar or feeler supporting carriage 152 formed with slots 154 therein for receiving feeler elements 156. The feeler elements are urged inward toward the channels 36 by springs 158, but their inward movement is limited by a shoulder 160 on the lower edge of the feeler element engageable with the carriage 152. The outer end of each feeler element is provided with a laterally extending foot 162 engageable with an actuating pin 164 of a pneumatic or electrical control means 166 mounted on a stationary supporting strip 168 to energize actuating means 72 for moving the article controlling frame 42 as described above with reference to FIGS. 2a, 2b and 2c.

The transversely movable feeler supporting carriage 152 is provided on its lower edge with antifriction slides 170 movable along a guide strip 172 on support 150 and is further guided by antifriction rollers 174 mounted on brackets 176 and bearing against the upper surface of a feeler retaining strip 175 secured to the carriage 152. A compression spring 178 bears against one end of the carriage 152 and a bracket 179 to urge the carriage and feeler elements 156 to the left as seen in FIG. 13 so that the inner ends 180 of the feeler element will normally be positioned to engage the foremost bottle in each of the channels 36 as shown in full lines in FIG. 13. However, the carriage 152 and the feeler elements 156 supported thereby are movable to the right and to the dotted line position of FIG. 13, by means of an arm 182 which is mounted on the front element 50 of the article controlling frame 42 and engageable with the left hand end 183 of carriage 152. In practice, the feeler elements 156 are preferably positioned a short distance, say about ⅛ inch to the right of the center of the channels 36 as seen in FIG. 13 so that when they are moved transversely to the dotted line position with the carriage 152, the inner ends 180 of the feeler elements will move out of engagement with the bottles and will not rub against the bottles or cause them to be displaced sideways in the channels 36.

With this construction, the action of the article feeding means of FIG. 1 in moving articles into the channels 36 and into positions to engage the inner ends 180 of all of the feeler members 156 will serve to cause the articles to depress all of the actuating pins 164 of the control means 166. When this occurs, the actuating means 72 is operable to move the article controlling frame 42 to the right as seen in FIGS. 2a, 2b, 2c, 13 and 14. At the same time, the top bar 78 and stop pins 80 are moved to the positions of FIGS. 2b and 2c to prevent additional bottles from being fed into the channels 36 and to separate the bottles 82 on the in-feed plates 48 from the bottles which have already been fed into the channels 36 and into positions above the vertical passages 28 of the packer grid 10. Further in accordance with the construction of FIGS. 13 and 14, the movement of the article controlling frame 42 to the right under the action of actuating means 72 causes the arm 182 on the frame 42 to engage the end 183 of the feeler supporting carriage 152 to move the carriage and feeler elements 156 to the right as seen in FIG. 13 against the action of compression spring 178. During such movement, the actuating pins 164 of the control means 166 are held depressed by the foot 162 on each feeler element until the bottle-engaging end 180 of each feeler element has moved transversely away from the bottle which it previously engaged and to the dotted line position of FIG. 13. The feeler elements 156 are thereby moved out of contact with the rounded surfaces of the bottles or article which previously served to actuate the feeler element. Furthermore, the inward movement of the feeler elements under the action of the springs 158 is limited by the shoulder 160 thereon to prevent the feeler elements from moving so far inward that it will engage the side of a bottle. As a result of the transverse movement of the feeler elements to the dotted line position of FIG. 13, the bottles or articles in the channels 36 are completely relieved of any pressure or restriction due to the action of either the feeding means 6 or the feeler elements 156. They are instead completely disengaged and freed to permit each bottle to assume an erect position, or to shift the limited distances relative to each other which may be necessary to preclude tilting, cocking or frictional engagement of the bottles with each other. Accordingly, every bottle is free to move downward through the vertical passages 28 of the packer grid without interferences with any other bottle. The speed of operation of the equipment can, therefore, be increased without danger of improper movement or jamming of the bottles or articles during the arranging and movement thereof, and the delays in operation and damage to the equipment heretofore encountered can be reduced or eliminated altogether.

The constructions described above are particularly adapted for use in loading bottles into cases or cartons and although the arrangements shown in FIGS. 1, 2a, 2b and 2c, are designed to deliver two dozen bottles by gravity to a case located below the packer grid, the equipment may be employed to handle either larger or smaller numbers of bottles as desired. Thus the equipment may discharge a single row, set or group of articles to a receptacle on each cycle of operation and of course the number of horizontal channels and the number of articles fed into each channel can be varied in order to fill one or more "six packs" or other receptacles at a time. Furthermore, the articles handled by the equipment may be of any type desired such as cans, packages, fruit, eggs or the like. The equipment may in fact be used to package a single article at a time and the articles may be arranged in various staggered or predetermined arrangements within the channels depending upon the location and arrangement of the vertical passages in the packer grid and the feeler elements which control the operation of the actuating means for the article controlling frame employed. It will also be apparent that the articles discharged from the vertical passages of the equipment may be deposited on a conveyor or elsewhere in predetermined arrangement instead of being discharged into a receptacle.

In each of the forms of the invention illustrated and described, the packer grid is constructed as a unit which only supports the dividers of the control head, but also has the control mechanism stop means and feed in plates from the feeding means carried thereby. Constructions of this type serve to simplify the equipment and assure accurate alignment, registration and cooperation of the elements during operation. At the same time, the equipment may be more easily assembled and disassembled and removal of the control head and dividers from the packer grid renders all of the elements accessible for easy access in the event any repairs, adjustments or replacement of parts should become necessary.

It will thus be apparent that the assembly provided is adapted for rapid operation in successive cycles in packaging one group of articles after another. At the same time, the articles being packed are isolated and arranged in a manner to prevent undesired tilting, jamming or displacement of the bottles or articles during the assembling and movement thereof. Moreover, the interfitting and aligned portions of the dividers and packer grid and the nesting of the article supporting strips in recesses in the dividers serve to eliminate the interrupted and irregular surfaces of the vertical channels through which the articles are discharged. In this way, the assembly and combination of elements overcomes the major problems heretofore encountered in such equipment and eliminates those constructions which have given rise to breakage, jamming and interruptions in the assembling and packaging of articles heretofore.

It will be clearly apparent from the foregoing description and drawings that numerous changes may be made in the form, construction and arrangement of the parts and the manner in which they may be actuated and controlled. In view thereof, it should be understood that the particular embodiments of the invention which have been shown and described are intended to be illustrative only and are not intended to limit the scope of the invention.

I claim:

1. In equipment for depositing articles in a receptacle, which equipment embodies a stationary support, a control head mounted in a fixed position on said support and having a plurality of dividers defining article receiving channels, article feeding means for moving articles into said channels, a control frame having article supporting means thereon movable transversely of said channels into and out of article supporting positions, and a packer grid mounted in a fixed position on said support below the control frame and having means thereon for guiding articles vertically from the control head to a receptacle positioned beneath the packer grid, the improvement which comprises the combination of the dividers and packer grid wherein the lower edges of the dividers on the control head extend downward below the control frame, and the packer grid has upwardly facing positioning means thereon engageable by the lower edges of the dividers to hold the dividers and packer grid in fixed relative positions during operation of the equipment.

2. Equipment as defined in claim 1 wherein the packer grid presents upwardly facing substantially smooth surfaces, and the control frame is supported on said surfaces of the packer grid and is slidably movable thereon transversely of the packer grid to move said article supporting means into and out of article supportnig position.

3. Equipment as defined in claim 1 wherein the dividers are provided with recesses in the side walls thereof, and the article supporting means on the control frame are located in said recesses when moved out of article supporting position and present exposed surfaces substantially flush with the adjacent surfaces of the dividers to cooperate therewith in providing substantially continuous, smooth surfaces over which the articles are movable downward to the packer grid.

4. Equipment as defined in claim 1 wherein the packer grid has finger supporting blocks thereon with flexible fingers extending downward therefrom, and the upper ends of the finger supporting blocks project above the packer grid and are spaced apart to receive the lower edges of the dividers therebetween.

5. Equipment as defined in claim 1 wherein article stop means are movable with the control frame into and out of position to prevent the movement of articles from the article feeding means into the channels between the dividers of the control head.

6. Equipment as defined in claim 1 wherein feeler elements are yieldably urged into the channels between the dividers of the control head into position to be actuated by articles in said channels, and actuating means responsive to movement of said feeler elements and connected to the control frame to move the frame.

7. Equipment as defined in claim 6 wherein means are positioned to be engaged by the feeler elements on movement thereof into the channels to limit the distance they project into said channels.

8. Equipment for depositing articles in a receptacle comprising a control head having a plurality of parallel dividers defining article receiving channels, article feeding means for moving articles into said channels, a control frame having article supporting means thereon movable transversely of said channels into and out of article supporting positions, stop means movable with said control frame into and out of position to prevent the movement of articles from the article feeding means into the channels, said stop means being engageable with articles entering said channels to space the same from articles already in the channels.

9. Equipment as defined in claim 8 wherein a lost mottion connection is provided between the control frame and said stop means.

10. Equipment for depositing articles in receptacles comprising a control head having a plurality of parallel dividers defining channels for receiving articles to be deposited, a packer grid located beneath the control head and having an interfitting connection with the dividers to hold the dividers in place, a control frame having article supporting members thereon, said control frame being supported by the packer grid and slidably movable thereon, and actuating means connected to the control frame for moving the control frame and its article supporting members into and out of a position wherein the article supporting members support articles in said channels.

11. Equipment as defined in claim 10 wherein control mechanism responsive to the presence of articles in said channels is supported by said packer grid and connected to said actuating means for actuating the same.

12. Equipment as defined in claim 11 wherein said control mechanism includes a feeler element for each of said channels which is yieldably urged into the channel and into a position to be engaged by an article therein, and means under control of all of said feeler elements to complete a circuit for actuating said actuating means when all of said feeler elements are engaged by articles.

13. Article handling equipment comprising a packer grid having means defining a plurality of passages for guiding articles under the action of gravity to a predetermined location, article controlling means located adjacent the upper ends of said passages and movable transversely of the passages into and out of a position to permit articles to move downward through said passages, feeler means located on one side of said packer grid in position to be engaged by articles located in said discharge positions above said passages, means for moving said article controlling means to a position which will permit articles to pass downward from said discharge positions through said passages under the action of gravity, article feeding means located on the opposite side of said packer grid for moving articles toward said feeler means and into said discharge positions, and stop means operable upon movement of said control means to control the movement of articles from said feeding means to said discharge positions.

14. Article handling equipment as defined in claim 13 wherein said article controlling means, said feeler means and said stop means are all supported by the packer grid.

15. Article handling equipment comprising article feeding means, article controlling means positioned to receive and support articles received from said article feeding means, said article controlling means being movable from beneath articles supported thereon to discharge articles from said equipment and stop means located between the article feeding means and the article controlling means, said stop means being movable in response to movement of the article controlling means to positions wherein the stop means serve to space articles being fed by the article feeding means from articles supported on said article controlling means.

16. Article handling equipment as defined in claim 15 wherein feeler means are mounted on the packer grid and positioned to be engaged by articles supported on said article controlling means, and actuating means responsive to movement of said feeler means are operable to actuate said article controlling means and said stop means.

17. Article handling equipment comprising means defining a plurality of horizontal channels, article feeding means movable to urge articles into said channels, means defining a plurality of vertical passages having the upper ends thereof aligned with said channels, article controlling means having elements thereon located adjacent the upper ends of said passages and in position to support articles moved into the horizontal channels by said article feeding means, sensing means located adjacent portions of the horizontal channels remote from the article feeding means and positioned to be engaged by articles urged into the horizontal channels by said article feeding means, stop means located between the article feeding means and said article supporting elements, and actuating means controlled by said sensing means to move the elements of the article controlling means from beneath articles in said channels to permit articles to move from said channels into said vertical passages under the action of gravity and to move said stop means into positions to prevent the movement of articles into said channels by said feeding means.

18. Article handling means as defined in claim 17 wherein the means defining the horizontal channels are separable from the remainder of the equipment to provide access to the remainder of the equipment.

19. Equipment for depositing articles in a predetermined arrangement in a receptacle comprising means defining a plurality of horizontal channels for receiving the articles to be deposited, means for feeding articles into said channels, sensing means associated with each channel and responsive to the presence of an article in a predetermined position in said channel, means defining vertical passages beneath the horizontal channels for receiving and guiding articles from said channels to a receptacle below the channels, article supporting means below the channels for supporting articles in the channels, actuating means controlled by said sensing means for moving the article supporting means from beneath articles in said channels, and means for spacing articles in said channels from articles being fed to said channels by said article feeding means upon movement of said article supporting means from beneath articles in said channels.

20. Equipment as defined in claim 19 wherein said article sensing means are movable into and out of position to be engaged by an article in said predetermined positions in said channels.

References Cited
UNITED STATES PATENTS

| | | | |
|---|---|---|---|
| 2,686,623 | 8/1954 | Wimmer et al. | 53—262 |
| 3,052,071 | 9/1962 | Copping | 53—62 |
| 3,057,136 | 10/1962 | Walter | 53—262 |
| 3,142,141 | 7/1964 | Walter | 53—262 |

RICHARD H. EANES, JR., *Primary Examiner.*